Dec. 30, 1930.  C. L. MATTHEWS  1,787,318
HOISTING HOOK
Filed Sept. 26, 1930
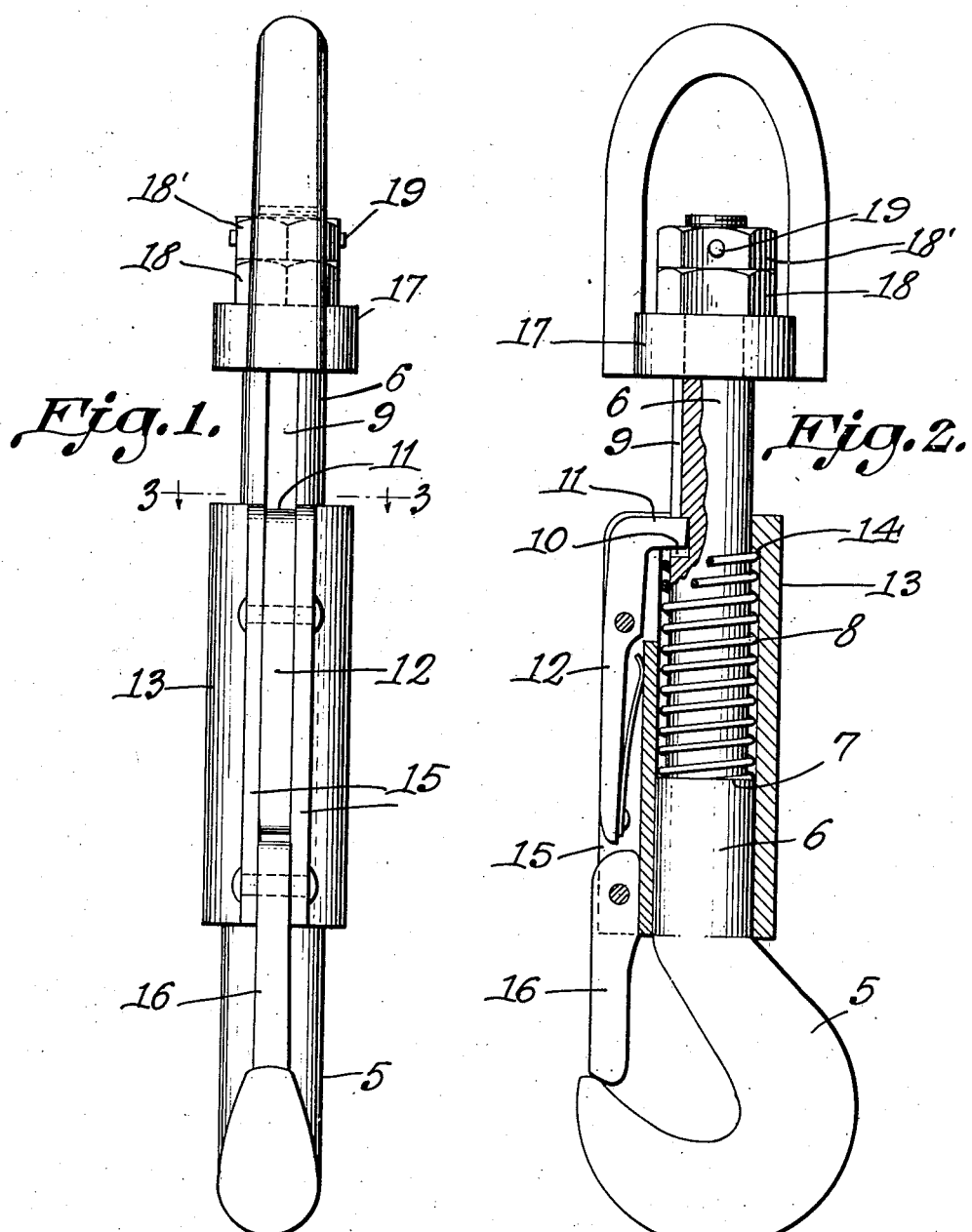
C. L. Matthews, Inventor
By C. A. Snow & Co.
Attorneys.

Patented Dec. 30, 1930

1,787,318

UNITED STATES PATENT OFFICE

CLYDE LESTER MATTHEWS, OF HAYNESVILLE, LOUISIANA

HOISTING HOOK

Application filed September 26, 1930. Serial No. 484,656.

This invention relates to hoisting hooks and more particularly to hoisting hooks designed for use in lifting or handling rods.

An important object of the invention is to provide means for locking the hook to the article being lifted, so that accidental displacement of the hook from the rod will be prevented.

Another important object of the invention is to provide means for readily and easily releasing the hook from the rod or article being lifted.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a front elevational view of a hook constructed in accordance with the invention.

Figure 2 is a side elevational view, the locking sleeve thereof being shown in section.

Figure 3 is a sectional view taken on line 3—3 of Figure 1.

Referring to the drawing in detail, the hook comprises a hook portion 5 and a shank 6, the shank being provided with a reduced portion defining a shoulder 7 against which one end of the coiled spring 8 rests.

The reduced portion of the shank is also formed with a groove 9 that has an offset portion 10 defining a keeper to receive the right angled end portion 11 of the pivoted latch 12, the latch being so constructed that it may be readily forced inwardly to disengage the right angled portion 11.

The latch member 12 is carried by the sleeve 13, which is formed with a shoulder 14 to engage one end of the coiled spring 8, to compress the coiled spring when the sleeve is moved to its active position, or to a position as shown by Figure 2 of the drawing.

Pivotally mounted between the ribs 15 of the sleeve is a locking finger 16 that engages the inner edge of the hook 5, to lock the hook in position on a rod or an article to be lifted or moved by the hook. Thus it will be seen that due to this construction, the sleeve 13 may be moved to a position as shown by Figure 2 to lock the device on an article, and that by pressing the latch 12 downwardly, the right angled portion 11 will be moved to disengage the shank, allowing the spring 8 to force the sleeve 13 rearwardly, opening the hook so that the hook may be readily disconnected from its work.

A latch 17 is swiveled on the shank 6 and is held in position by means of the swivel bearing 18 and nut 18', there being provided a pin 19 for securing the nut 18' to the shank.

I claim:

1. A safety hook comprising a hook portion and a shank portion, said shank portion having a recess formed therein, a sleeve slidably mounted on the shank, a latch member carried by the sleeve and engaging within the recess to hold the sleeve in its active position, a spring on the shank for moving the sleeve to its inactive position when the latch member is released, and means carried by the sleeve for engaging the hook to close the hook.

2. A safety hook comprising a hook portion and a shank portion, said shank portion having a groove formed therein and an offset portion at one end of the groove, a sleeve mounted on the shank portion, a latch member carried by the sleeve, said latch member having a right angled end portion movable in the groove to hold the sleeve against rotary movement on the shank, said latch adapted to engage within the offset portion to lock the sleeve against movement longitudinally of the shank, yieldable means for forcing the sleeve to its inactive position when the latch member is released, and a finger carried by the sleeve for engaging the hook to close the hook.

3. A safety hook comprising a hook portion and a shank portion, a sleeve mounted on the shank portion, a coiled spring on the shank portion and engaging the sleeve to normally urge the sleeve to its inactive position, a latch member on the sleeve for locking the sleeve in its active position, and means carried by the sleeve for engaging the hook to close the hook around an article engaged by the hook.

4. A safety hook comprising a hook portion and a shank portion, said shank portion having a reduced portion defining a shoulder, a sleeve mounted on the shank portion and having a shoulder, a coiled spring on the shank portion, said coiled spring being held between the shoulders of the shank and sleeve to normally urge the sleeve to its inactive position, a latch member for securing the sleeve in its active position, and a finger carried by the sleeve and cooperating with the hook portion to close the hook portion.

5. A safety hook comprising a hook portion and a shank portion, a sleeve slidably mounted on the shank portion, spaced ribs on the sleeve, a latch member pivotally mounted between the ribs and adapted to engage the shank to lock the sleeve against movement, a finger pivotally mounted between the ribs and adapted to engage the hook portion to close the hook around an article lifted by the hook.

In testimony that I claim the foregoing as my own, I have hereto affixed my signature.

CLYDE LESTER MATTHEWS.